May 20, 1958    H. D. ECKHARDT    2,835,861
AUTOMATIC PILOT MOTOR CONTROL SYSTEM
Filed Jan. 14, 1955

INVENTOR.
HOMER D. ECKHARDT
BY *Gordon Reed*

ATTORNEY

United States Patent Office 2,835,861
Patented May 20, 1958

2,835,861

AUTOMATIC PILOT MOTOR CONTROL SYSTEM

Homer D. Eckhardt, Cambridge, Mass., assignor to Minneapolis-Honeywell Regulator Company, Minneapolis, Minn., a corporation of Delaware Application January 14, 1955, Serial No. 481,850

8 Claims. (Cl. 318—489)

This invention relates to automatic condition control apparatus and particularly to automatic flight control apparatus for a dirigible craft such as airplanes. Automatic flight control apparatus for airplanes may include displacement devices such as vertical gyroscopes for stabilizing the airplane about its turn, roll and pitch axes. Such gyroscopes are generally related to earth coordinates through gravitational responsive slaving means. In airplanes of the fighter or interception type which may, while in flight, be operated at high bank or pitch altitudes, a displacement type gyroscope may, at such attitudes, attain a condition of gimbal lock when the gyroscope spin axis becomes aligned with one of its supporting gimbal axes and thereby become unsuitable as a stabilizing device. For this reason, rate gyroscopes having but two axes of rotation instead of displacement gyroscopes having three axes of rotation are preferred in the flight control apparatus for controlling airplanes attaining such high attitudes. Thus, a roll rate gyroscope may be used to stabilize the craft about its longitudinal axis and a pitch rate gyroscope may be used to stabilize the craft about its lateral axis. An aircraft automatically stabilized about the two above mentioned axes by the control apparatus may also include therein a device responsive to displacement of the craft from a datum, such as displacement from a particular course or heading. On deviation of the craft from a selected heading, the craft will be turned to regain such heading.

An aircraft of the type here considered is turned by causing operation of aileron surfaces on such craft, causing it to bank about its longitudinal axis, which bank will cause such craft to change heading and regain the selected heading.

When a craft of this type has its heading changed by banking the craft, the flight control apparatus may be provided with a surface position feedback to make the surface displacement from a normal position proportional to the craft heading displacement from the selected heading.

With only a roll rate feedback signal responsive to airplane motion to oppose a heading control signal, to modify the position of the ailerons, the craft banking rate is proportional to heading error. When the heading error is zero, the banking rate will be zero; however, the bank angle is not necessarily zero but may have a magnitude. This banked attitude will tend to cause the craft to overshoot or hunt about the desired heading.

It is therefore an object of this invention to provide novel means in flight control apparatus of an aircraft which operates ailerons to control heading to reduce the hunting of the craft about the desired direction of heading.

It is a further object of this invention to reduce the hunting of the craft about the desired direction by modifying the feedback effect of a roll rate gyroscope in apparatus which controls aileron surfaces on said craft.

It is a further object of the invention to modify the feedback effect of a roll rate gyroscope in a control system for aircraft aileron surfaces by connecting thereto a lag network.

The above and other objects of the invention will be more fully appreciated from the following description of a preferred embodiment of the invention taken in connection with accompanying drawings, wherein.

Figure 1:
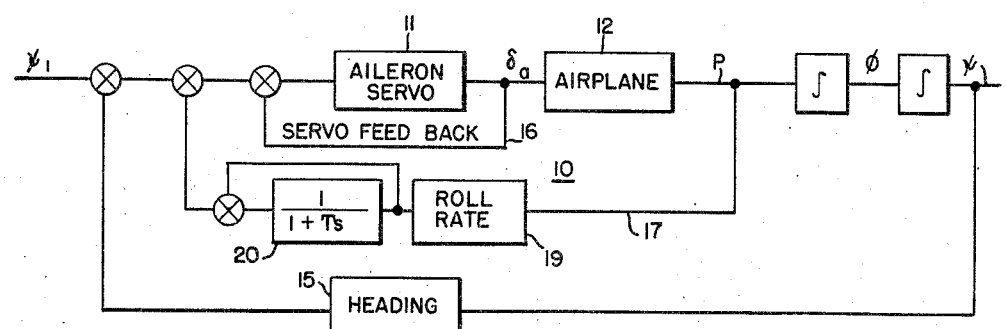
Figure 1 is a block diagram of a basic automatic control system for an aircraft embodying the subject invention.

The block diagram of Figure 1 illustrates an automatic control system for an aircraft to which this invention has been applied. Such control apparatus may also be used for controlling an aircraft to a desired altitude, heading or ground track. The invention will be considered, by way of example, when the apparatus is utilized to control heading. In Figure 1, the control system 10 includes an aileron operating servomotor means 11 for moving the aileron surfaces (not shown) of an airplane 12 an amount $\delta a$. Due to the operation of the ailerons, the airplane moves about its roll or longitudinal axis at a rate dependent upon the aileron displacement ($\delta a$) from a normal position. A time integration ($s$) of this roll rate of the craft results in the craft attaining a bank angle. When the craft is in a banked attitude in a coordinated turn, it changes its heading, or direction of the roll axis in a horizontal plane, at a rate which is dependent upon, and for small bank angles approximately proportional to, the magnitude of the bank angle, and thus since the amount of change in heading angle is equal to the time integral of the rate of change of heading, the heading angle change may be said to be proportional to the time integral of bank angle over the period of time considered. A heading responsive device 15 in the control system 10 which senses the change in heading of the craft in a horizontal plane controls the operation of the aileron servomotor 11. The system 10 includes a servomotor position feedback through the mechanism 16, and a bank or roll rate feedback through a mechanism 17 having a roll rate responsive device 19 and a lag device 20 connected thereto along with a direct roll rate responsive means which together operate to control the operation of the aileron servomotor 11.

If the apparatus of the block diagram of Figure 1 be considered as if the lag device 20 were omitted, then should the craft deviate from its selected heading, the heading device 15 would supply a control signal to the aileron servo 11. Since we are obtaining a feedback signal from the roll rate device 19, it may be said that the heading error signal is calling for a roll rate proportional to the heading error. In going from the roll rate initiated by the heading error to roll or bank attitude there is a 90° phase lag since the roll rate signal is 90° ahead in phase of the bank attitude. Additionally, in going from bank attitude, which is similar to heading rate, to heading change there is a second 90° phase lag. This follows, for we had stated that bank angle and heading rate were similar and in going from heading rate to heading displacement a second 90° phase lag appears. Thus, adding the two 90° lags, in going from a bank rate or roll rate to heading error there is a 180° phase lag. Thus, the response of the aircraft, that is a change in its heading occurs at least 180° after the heading deviation or command signal is applied to the aileron servomotor 11. Regardless of how low or high the frequency of a sinusoidal input to the aileron servomotor 11 is made, the aircraft heading angle response will lag at least 180° behind that input. Conventional feedback system analysis techniques will show that if a feedback consisting simply of a gain is placed around such a system as described above, the resulting system will oscillate with constant or increasing amplitude with time.

(These conventional techniques are described in James, Nichols, and Phillips: Theory of Servo Mechanisms, 1947; Brown and Campbell: Principles of Servomechanisms, 1948; Chesnut and Mayer: Servomechanisms and Regulating System Design, 1951.) Since the heading responsive device 15 in Figure 1 will constitute simply a gain or at least will ordinarily not contribute any appreciable lead in the system, the system of Figure 1 with the lag service 20 removed satisfies the conditions described above as adequate for causing sustained oscillations.

If the heading error signal can be caused to call for a roll angle instead of a roll rate, the change in heading angle in response to a heading error will lag behind that heading error by approximately 90° less than it would if the heading error called for a roll rate as described above. This would make it possible to stabilize the system (i. e. eliminate sustained oscillations). The heading error can be made approximately to call for a roll angle by actuating the aileron servo 11 with a signal proportional to the difference between the heading error signal and a signal approximately proportional to roll angle. In such a system the aileron servo 11 would cause the aileron to be deflected causing the aircraft to roll until the signal which is approximately proportional to roll angle was about equal to and opposite in sign from the heading error signal at which time the aileron servo 11 would have moved back toward its neutral or zero position, thereby moving the ailerons back toward their neutral position and tending to cause the airplane to come to rest in a condition such that the roll angle was approximately proportional to the heading error.

Figure 2:
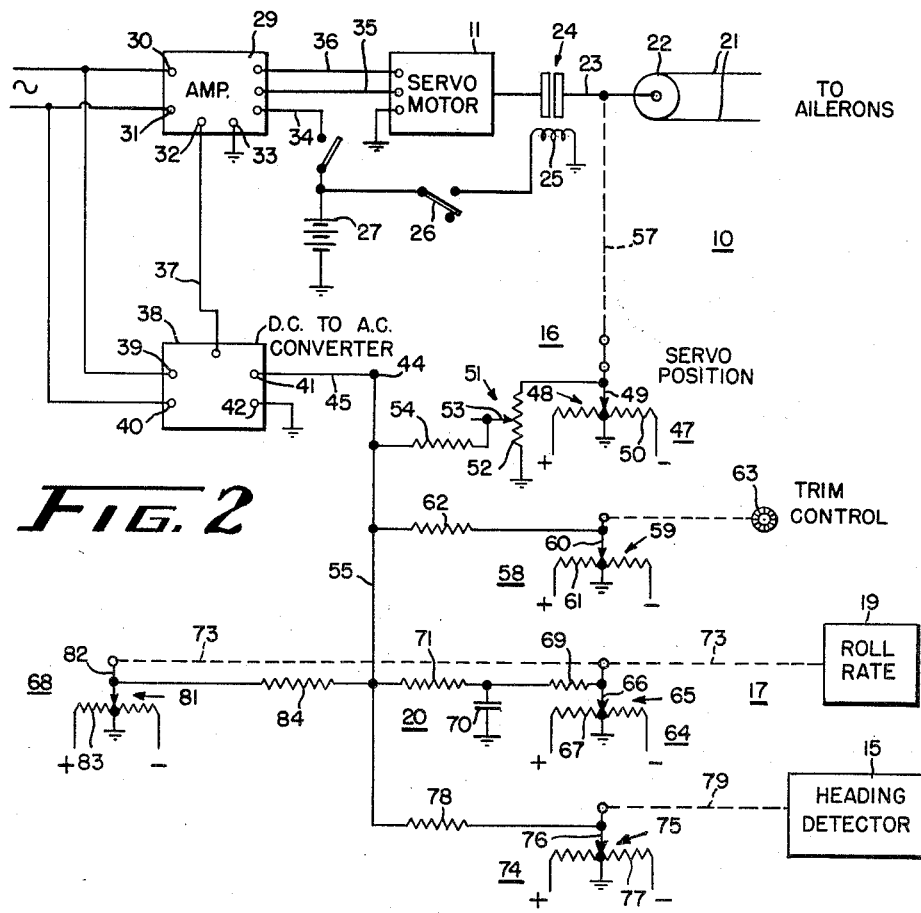
Figure 2 illustrates in electrical schematic form the general nature and relationship of the components of the control system of the present invention.

A signal which is approximately proportional to roll angle can be obtained by passing the output of a roll rate gyro through a lag network commonly referred to as an "integrating network" and having the form shown as resistor 69 and condenser 70 in Figure 2 where the input terminal to the network is at slider 66 and the output is at the connection between resistor 68 and condenser 70. Such a network used in conjunction with a roll rate gyro as at 19 and 20 in Figure 1 will produce a signal which is approximately proportional to bank angle over a certain adjustable range of frequencies.

In the present invention this range of frequencies was adjusted by conventional feedback systems analysis techniques to facilitate stabilization of the system.

Thus, through the use of the lag network 20, in combination with the roll rate device 19, we have stabilized the response of the control system and yet have retained the roll rate device 19, which responds in terms of aircraft coordinates, as a roll controlling device in the system.

The invention is shown in a more detailed embodiment in Figure 2 wherein aileron control surfaces (not shown) are operated by cables 21 extending from a cable drum 22 supported on an output shaft 23. The shaft 23 is operatively connected to the servo motor means 11 through a magnetic clutch 24. The clutch 24 includes an operating winding 25 which is connected through a single pole single throw switch 26 to a battery 27 for energization thereof. The servomotor 11 is of the direct current type known in the art, for example, as in U. S. Patent 2,267,114, and comprises two alternatively energized field windings both connected in series with an armature winding and a pulsing clutch winding. The opposite ends of the field windings may be alternatively connected to battery 27 through an amplifier 29 having two alternatively operable relays. The amplifier 29 is of the A. C. discriminator type known in the art which operates one or another of the pair of relays depending upon the phase relationship between the voltage across terminals 30, 31, connected to an A. C. supply and a control signal voltage across input terminals 32, 33 of the amplifier. Thus, if one amplifier relay is energized, it energizes one motor field winding, the armature winding, and the pulsing clutch winding. If the other relay of the amplifier is energized, the opposite field winding, the armature winding, and the pulsing clutch winding are energized. To provide this energization, a supply conductor 34 connects battery 27 with both relays, a conductor 35 extends from one relay to one motor field winding and a conductor 36 extends from the other relay to the remaining motor field winding.

Control signals are supplied to amplifier terminals 32 over a conductor 37 extending between amplifier 29 and a D. C. to A. C. converter 38. The converter 38 may be of the vibrator type and includes voltage supply operating terminals 39, 40, connected to the same supply voltage source as amplifier 29 and a pair of D. C. signal voltage input terminals 41, 42. A conductor 45 connects terminal 41 to a summing point 44 of an electrical network. The network in the present instance is illustrated as a parallel D. C. summing network which includes a plurality of signal generators. The signal generators are potentiometers, each having a grounded center tap resistor which ground is common to the ground of converter terminal 42. The network includes a plurality of signal generators as stated, comprising a servo or aileron position signal generator 47, a trim signal generator 58, a roll rate signal generator 64, a direct connected roll rate signal generator 68 and a heading deviation signal generator 74.

The signal generator 47 comprises a potentiometer 48 having an adjustable slide 49 and grounded center tapped resistor 50. A ratio potentiometer 51 comprising a resistor 52 and adjustable tap 53 has its resistor 52 connected across slider 49 and the center tap of resistor 50. A summing resistor 54 connects adjustable tap 53 with the summing conductor 55 which is connected to the summing point 44. The slider 49 is positioned along resistor 55 from the output shaft 23 by a suitable operating connection 57. The signal generator 58 comprises a potentiometer 59 having an adjustable slider 60 and a grounded center tapped resistor 61. Slider 60 is connected through a summing resistor 62 to the summing conductor 55. The slider may be positioned along resistor 61 in either direction from the center tap of the resistor by an adjustable trim control knob 63. The signal generator 64 comprises a roll rate potentiometer 65 having an adjustable slider 66 and a center tapped resistor 67. The slider 66 may be adjusted along resistor 67 in either direction from the center tap by a roll rate gyroscope 19 through a suitable operating connection 73. The direction of movement of slider 66 from its center tap depends upon the direction that the aircraft is being moved about its roll axis and the magnitude of such displacement depends upon the rate at which such movement occurs. Connected between slider 66 and the resistor ground center tap is a lag device 20. The lag device comprises a pair of circuit elements, namely, a resistor 69 and capacitor 70 in series relation. The remaining end of resistor 69 is connected to slider 66 and the remaining or opposite end of capacitor 70 is connected to the center tap ground. Extending from the junction of resistor 69 and capacitor 70 is a summing resistor 71 which extends to the summing conductor 55. Signal generator 68 comprises a roll rate potentiometer 81 having a roll rate gyroscope operated slider 82 and a grounded center tapped resistor 83. A summing resistor 84 connects slider 82 to summing conductor 55. This signal generator damps rolling motion of the craft. The signal generator 74 comprises a heading error potentiometer 75 comprising a slider 76 and a center tapped resistor 77. The slider 76 is adjusted in either direction from the center tap by an operating connection 79 extending from a heading detector 15. This heading detector may be a directional gyroscope if the craft is to be stabilized on course. Alternatively, it may be a device for supplying a signal in accordance with the displacement of the craft from a datum. The slider 76 is connected to summing conductor 55 by a summing resistor 78. The potentiometer resistors 50, 61, 67, 83 and 77 have their opposite ends connected to a D. C. voltage supply as indicated.

Although the control system has been described with reference to an arrangement for controlling the aircraft heading by banking the craft about its roll axis, it is contemplated that the system may be used with reference to controlling the craft about other axes. The necessary feature of the system immaterial to the axis being controlled to maintain a datum is that where a quantity (actual heading) or motion is to be controlled by comparing a signal proportional to said quantity (actual heading) with a command signal (desired heading) and using the difference (actual heading) between said command signal and said signal proportional to said quantity or motion, this difference to be called a difference signal (heading error), to control a second quantity (bank rate) or motion, said second quantity or motion being controlled by means of comparing said difference signal (heading error) with a signal which is a function of said second quantity (bank rate) to form a second difference signal, which second difference signal is used to activate a means (aileron servomotor) which actuates said second quantity or motion where said first quantity or motion is approximately proportional to the time integral of said second quantity or otherwise stated, said first quantity (actual heading) lags approximately 180° behind said second quantity (bank rate), the said signal which is the said function of said second quantity (bank rate) should be formed by passing a signal proportional to said second quantity or motion through a lag network or similar lag producing means, the output of said lag network or similar lag producing means then constituting said signal which is the said function of said second quantity or motion.

It will now be apparent therefore that there are numerous changes which could be made in details of the herein before described arrangement by those skilled in the art without departing from the spirit or scope of the invention. Therefore, it is intended that all the foregoing description be considered merely as illustrative and not in a limiting sense.

What is claimed is:

1. Control apparatus for an aircraft having roll axis and having aileron control surfaces variably displaceable from a normal position to determine the rate of angular movement of the craft about its roll axis, said apparatus comprising; a servo motor for positioning said surfaces, a balanceable network means for effecting operation of said motor on unbalance of said network, follow up means driven by said servo motor, means responsive to the angular rate of movement of the craft about said roll axis, further means responsive to departure of the direction of the roll axis of the craft from a predetermined given or like direction, a first signal providing means driven by the follow-up means, a second signal providing means, including a lag device, driven by the angular rate means, a third signal providing means driven by the further means, and means for supplying all of said signals to said network, the signals from the first and second providing means opposing the signal from the third providing means.

2. Control apparatus for an aircraft having attitude control means variably displaceable from a normal position to determine the rate of angular movement of the craft about the longitudinal axis thereof, said apparatus comprising a servo motor means for operating said attitude control means, means including a balanceable network connected to said servo motor means for effecting operation of said motor on unbalance of said network, heading responsive means for unbalancing said network, follow-up means driven by said servo motor for rebalancing said network, means responsive to the rate of craft movement about said longitudinal axis, and means including a lag network controlled by the rate responsive means for opposing said heading responsive means in said network upon deviation of the craft heading.

3. In a control system for a craft having a movable control surface for controlling the attitude of said craft about an axis, apparatus comprising: a servomotor means for operating said control surface, a reference device for producing a signal in response to deviations of said craft relative to a desired datum which deviations are altered by time duration of change in attitude about said axis, means for producing a follow-up signal in accordance with the sense and magnitude of the position of said control surface, rate means responsive to rate of attitude change about said axis, resistance-reactance network connected to said rate means for producing a signal lagging that provided by said rate means, and means including a network for controlling said servomotor and responsive to said attitude reference signal, said follow-up signal, and said lag network signal.

4. In a heading stabilizing system for a craft having aileron surfaces for controlling the attitude of a craft about its roll axis, apparatus comprising: a servomotor for operating said surfaces, heading responsive means for producing a first signal in response to deviations of said roll axis relative to a desired direction, means for producing a follow-up signal in accordance with the displacement of said control surfaces, means for producing a third signal in accordance with a rate of roll of the craft, means for producing a fourth signal from said third signal comprising a lag network connected to said rate responsive means, and means responsive to said first, second, and fourth signals for energizing said servomotor.

5. In an automatic control system for a craft having a movable control surface for controlling the attitude of the craft about an axis thereof, apparatus comprising: a servomotor operating said control surface; means including a reference instrument for producing a first control signal in response to deviations of said craft position from a datum position; control means responsive to said first signal for operating said servomotor to operate said surface; means for producing a follow-up signal in accordance with the displacement of said servomotor and opposing said first signal in said control means, said aircraft thereby changing its attitude about said axis at a rate proportional to the deviation from a datum position; means responsive to the rate of change of attitude of the craft about said axis for developing a third or attitude rate signal; a resistance-reactance lag network utilizing said third signal to produce a fourth signal retarded in phase with respect to said third signal and connected to said control means to control said servomotor in opposition to the control of said first signal, to stabilize the flight path of the craft with respect to said datum in going from an attitude rate initiated by the deviation from datum to an attitude displacement resulting from a time duration of attitude rate and to said datum position due to a time duration of the changed attitude of the craft.

6. Control apparatus for an aircraft having a roll axis and having roll tilt providing means variably displaceable from a normal position to determine the rate of angular movement of the craft about said roll axis, said apparatus comprising: a servomotor positioning said roll tilt providing means; a balanceable network means for effecting operation of said motor on an unbalance of said network; follow-up means driven by said servomotor; means responsive to the angular rate of movement of the craft about said roll axis; further means responsive to departure of the direction of the roll axis of the craft from a normal position; a first signal providing means driven by the follow-up means, a second signal providing means including a lag device driven by the angular rate means, a third signal providing means driven by the further means and means for supplying all of said signals to said network, the signals from the first and second providing means opposing the signal from the third signal providing means.

7. Control apparatus for an aircraft having attitude control means variably displaceable from a normal position to determine the rate of angular movement of the craft about the longitudinal axis thereof, said apparatus comprising a servo motor means for operating said attitude control means, means including a balanceable system connected to said servo motor means for effecting operation of said motor on unbalance of said system, heading responsive means for unbalancing said system, follow-up means driven by said servo motor for rebalancing said system, means responsive to the rate of craft movement about said longitudinal axis and means including a lag system controlled by the rate responsive means for opposing said heading responsive means in said system upon deviation of the craft heading.

8. Control apparatus for an aircraft having attitude control means variably displaceable from a normal position to determine the rate of angular movement of the craft about the longitudinal axis thereof, said apparatus comprising a servo motor means for operating said attitude control means, means including a balanceable network connected to said servo motor means for effecting operation of said motor on unbalance of said network, heading responsive means for unbalancing said network, means responsive to the rate of craft movement about said longitudinal axis, and means including a lag network controlled by the rate responsive means for opposing said heading responsive means in said network upon deviation of the craft heading.

References Cited in the file of this patent

UNITED STATES PATENTS

| | | |
|---|---|---|
| 2,088,654 | Hull | Aug. 3, 1937 |
| 2,548,278 | Werkler | Apr. 10, 1951 |
| 2,705,116 | Yates et al. | Mar. 29, 1955 |